Nov. 8, 1932.  M. R. ANSTICE  1,886,618
SLINGER FOR DRIVE UNITS
Filed Oct. 24, 1930  3 Sheets-Sheet 3
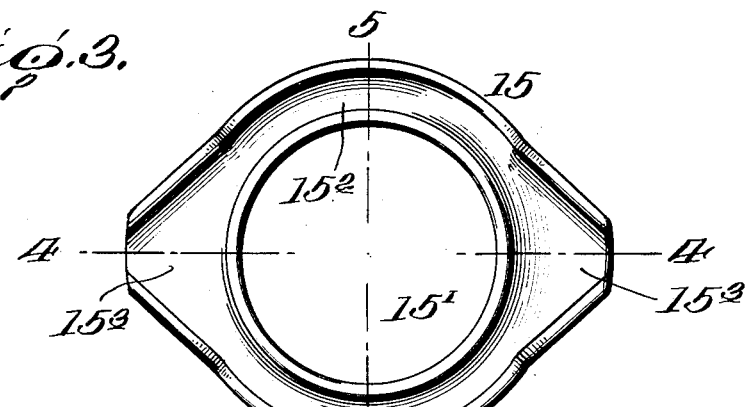
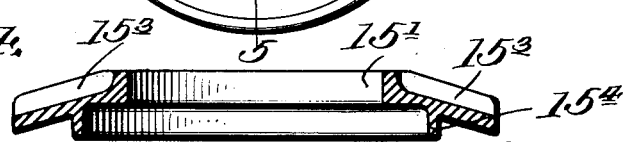
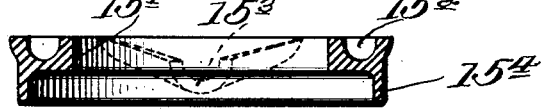
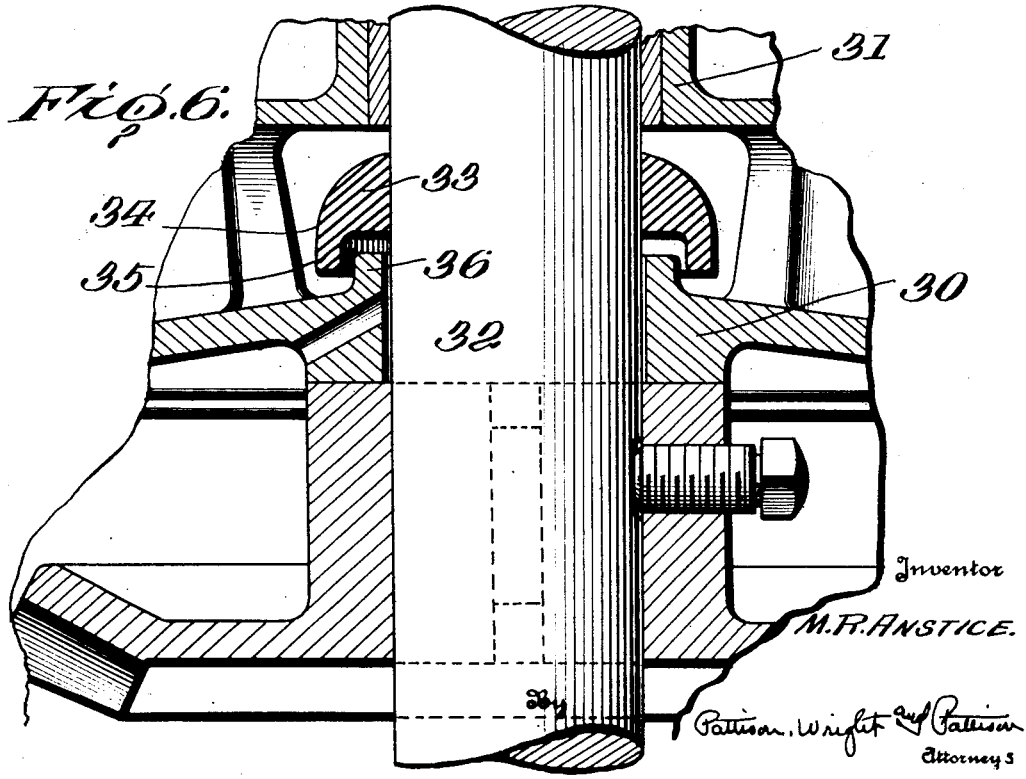

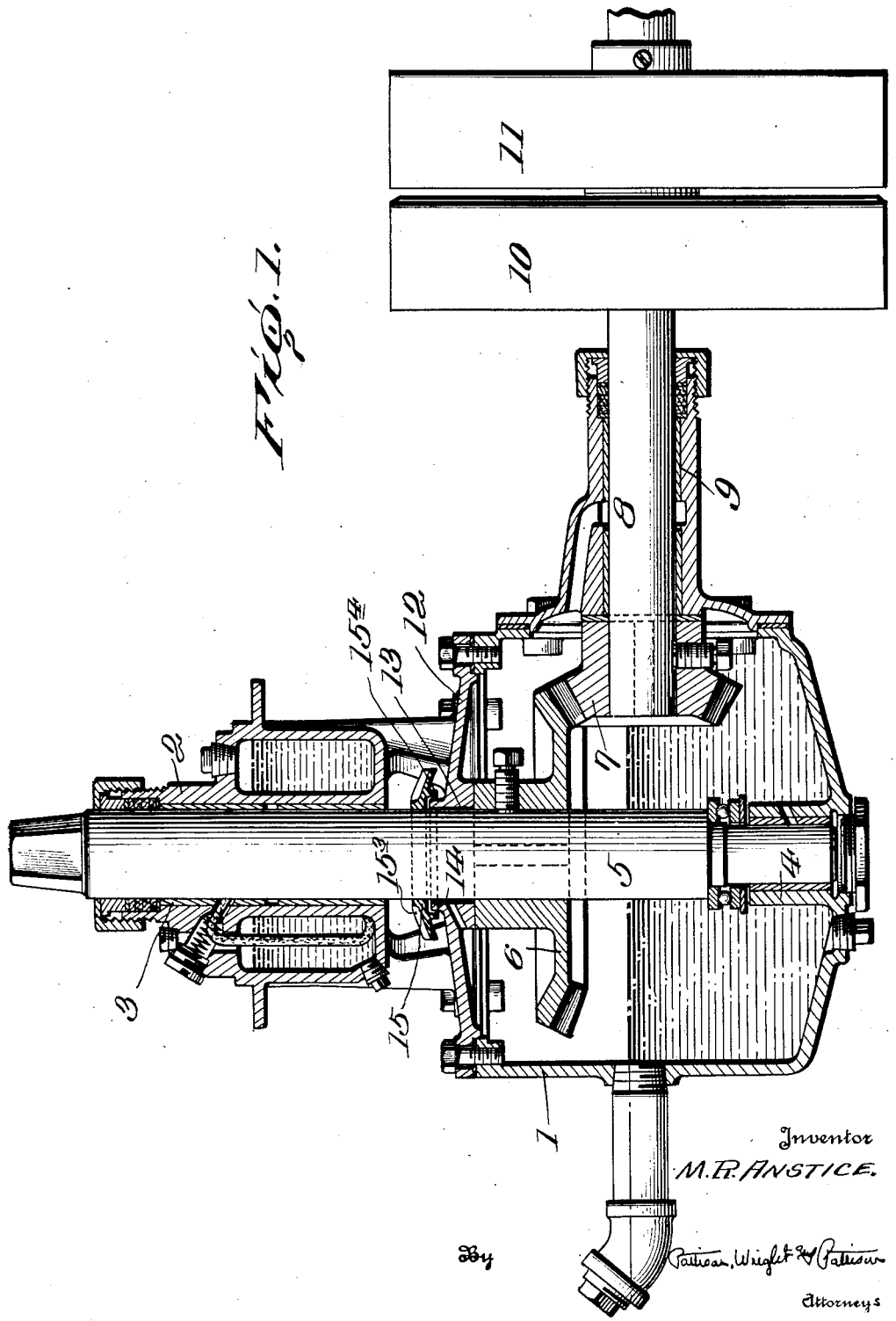

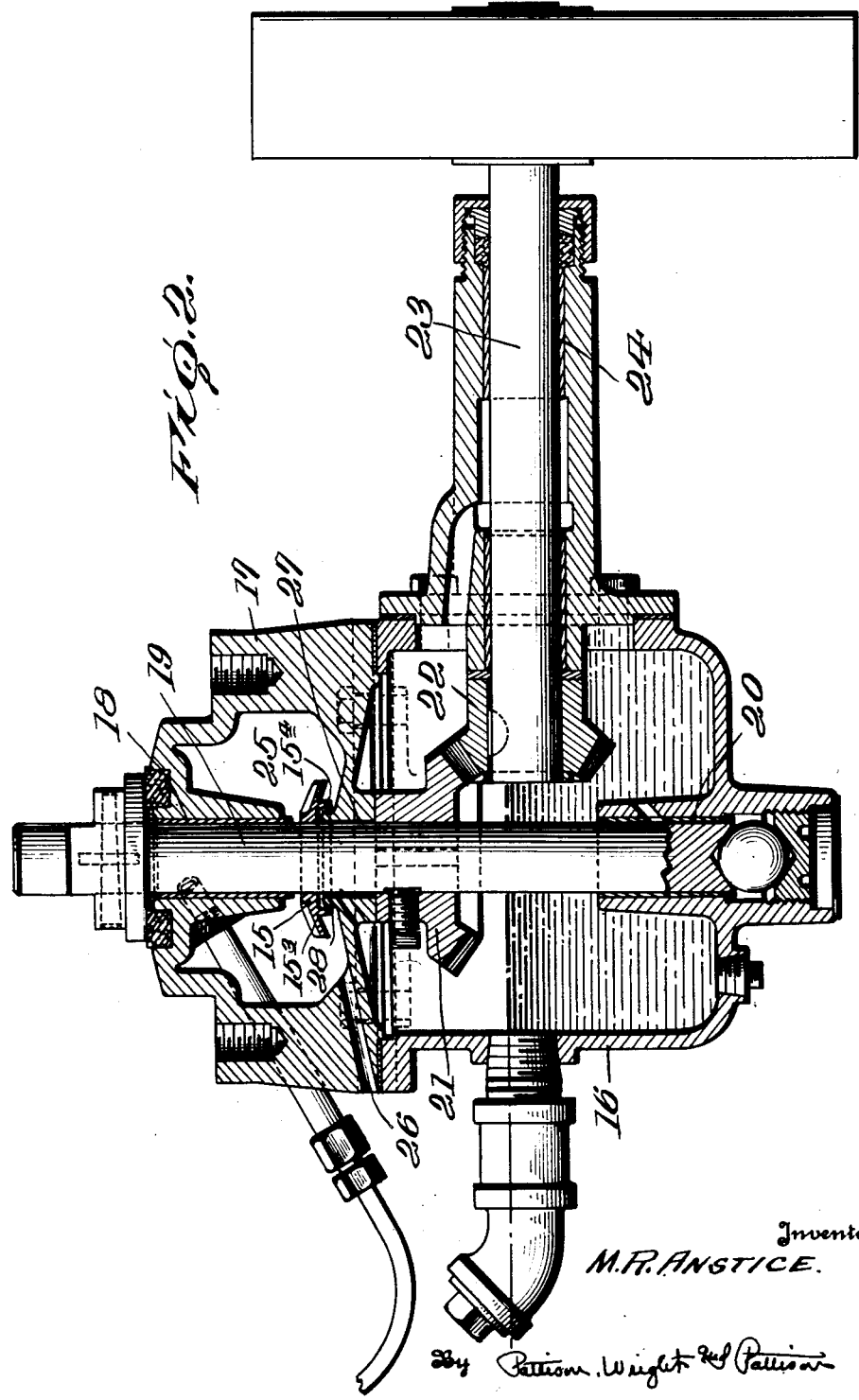

Patented Nov. 8, 1932

1,886,618

UNITED STATES PATENT OFFICE

MORTIMER R. ANSTICE, OF ROCHESTER, NEW YORK, ASSIGNOR TO JOSIAH ANSTICE & CO., INC., OF ROCHESTER, NEW YORK

SLINGER FOR DRIVE UNITS

Application filed October 24, 1930. Serial No. 491,044.

This invention relates to certain new and useful improvements in a drive unit, especially adapted to be used in connection with potato peelers, food mixers, liquid stirrers or any other device where a vertically disposed driven shaft is employed for rotating a member within a receptacle, the object being to provide a drive unit composed of a pair of superposed housings, each being provided with a bearing with a slinger disposed between the same carried by the driven shaft so as to prevent the liquid from creeping down the shaft from the upper bearing into the lower housing.

The invention relates more particularly to the construction of a slinger which is formed of rubber and is adapted to be placed on the vertically disposed driven shaft so that by its elasticity, it will adhere to the shaft in such a manner that a liquid tight joint is formed between the shaft and slinger, whereby all danger of any liquid creeping past the slinger is prevented.

Another object of my invention is to provide a slinger in the form of a circular member having an annular gutter with oppositely disposed spouts which are adapted to convey the liquid outwardly beyond the opening in the lower housing so that all danger of the splash of the liquid from splashing into the opening around the shaft of the lower housing is prevented when the shaft is stationary.

Other and further objects and advantages of the invention will be hereinafter set forth and the novel features thereof defined by the appended claim.

In the drawings,

Figure 1 is a vertical section of one embodiment of my invention;

Figure 2 is a vertical section of another embodiment of my invention;

Figure 3 is a plan view of a rubber slinger detached

Figure 4 is a section taken on line 4—4 of Figure 3;

Figure 5 is a section taken on line 5—5 of Figure 3; and

Figure 6 is a detail vertical enlargement through a portion of the drive unit showing a modified form of slinger.

In the embodiment of my invention as shown in Figure 1, I show a pair of superposed housings 1 and 2, the upper housing being provided with a self-oiling bearing 3 and the lower housing with a bearing 4 in which the reduced lower end of a driven shaft 5 is adapted to be mounted, the upper end extending through the bearing 3 and it is preferably provided with means at its extreme end to extend into a socket of a member adapted to be rotated.

The shaft 5 carries a gear 6 meshing with a gear 7 carried by a driving shaft 8 mounted in a suitable laterally extending bearing 9, said shaft being provided with drive pulleys 10 and 11 adapted to be driven from any suitable source of power, so that when the shaft 8 is revolved through the meshing gears 6 and 7, the vertically disposed shaft 5 will be rotated.

The housing 1 forms an oil chamber in which lubricant is adapted to be maintained at a predetermined level so that the bearing 4 and gears 6 and 7, as well as the bearing 9 will be thoroughly lubricated. The housing 1 is provided with a cover 12 having a central boss 13 through which the shaft 5 extends so as to form an annular upwardly extending flange 14 above the cover and the upper surface of the cover is preferably inclined as clearly shown so that any liquid falling on the cover will be conveyed off of the housing and as shown the cover is secured in position by bolts and a packing is arranged between the upper edge of the housing and the cover so as to thoroughly protect it from liquid.

In the construction herein shown, the housing 2, which is superposed above the housing 1, is spaced therefrom and in the space between said housing on the shaft 5, I mount my improved construction of rubber slinger 15 so that the liquid creeping down the shaft from a bearing 3 will be slung outwardly by centrifugal force as the shaft rotates, thereby preventing any liquid from passing into the lower housing and diluting the lubricant contained therein.

The rubber slinger adheres to the shaft by the elasticity thereof and as the shaft 5 is inserted in the bearings from the top, it can be readily inserted and removed as the slinger can be caused to slide along the shaft as the shaft is being withdrawn and in inserting the slinger when the shaft has been passed through the upper bearing 3, the slinger is placed on the shaft and the shaft is then forced downwardly into the lower housing into its lower bearing 4, it, of course, being understood that the gear 6 is placed thereon and secured in adjusted position. By the elasticity of the rubber slinger, it can then be adjusted into its proper position as clearly shown in Figure 1.

In the embodiment of my invention as shown in Figure 2, I employ a pair of superposed housings 16 and 17, the upper housing 17 being provided with a self-oiling bearing 18 in which is mounted a shaft 19, the lower end of which is mounted in a bearing 20 disposed in the housing 16, said housing being adapted to contain lubricant which is maintained at a predetermined level.

The shaft 19 carries a gear 21 within the housing 16, meshing with gear 22 carried by a driven shaft 23 mounted in a lateral bearing 24, which bearing is supplied with lubricant from the oil contained within the housing 16 so that the bearings 20, gears 21 and 22 and bearing 24 are maintained properly lubricated.

In the embodiment of the invention as herein shown, the upper housing 17 forms a cover for the lower housing 16 and is provided with a chamber 25 having an inclined bottom, provided with a drain outlet 26 through which the liquid working through the upper bearing 18 will pass. The lower end of the housing 17 is provided with a central boss 27 forming an annular flange 28 and disposed within the chamber 25 on the shaft 19 is a slinger 15 constructed in substantially the same manner as disclosed in the embodiment of the invention as shown in Figure 1, whereby the liquid creeping down the upper bearing 18 will be conveyed away from the apertured boss, thereby preventing it from passing into the lower housing.

The slinger 15 as shown in Figures 1 and 2 is formed of rubber and is preferably circular in shape having a central opening $15^1$ which is preferably formed of a less diameter than the diameter of the shaft so that it is necessary to stretch the slinger in order to position it on the shaft, whereby it will adhere to the shaft in its adjusted position and form a liquid tight joint between the inner wall of the opening and outer circumference of the shaft, thereby preventing any danger of liquid creeping downwardly between the shaft and the inner wall of the slinger. The slinger is provided with an annular groove $15^2$ forming a gutter which is provided with oppositely disposed spouts $15^3$ for conveying the liquid creeping down through the upper bearing of the shaft outwardly beyond the opening in the top of the lower housing and this construction has a great advantage when the unit is stationary as the liquid is thrown outwardly so that all danger of any liquid splashing into the opening in the top of the lower housing is prevented.

The slinger is formed with an annular depending flange $15^4$ adapted to extend downwardly beyond the annular flange of the boss of the top of the housing and is preferably spaced therefrom as clearly shown in Figures 1 and 2, whereby a construction of an elastic slinger is provided which, when the drive unit is in operation, throws the liquid dropping thereon from the upper bearing outwardly by centrifugal force so that it will drain outwardly from off the top of the lower housing.

When the unit is stationary and the liquid drops onto the slinger from the upper bearing, it is caught by the gutter and drains out the oppositely disposed spouts and falls onto the top of the housing a sufficient distance away from the central boss through which the shaft passes so as to prevent any possibility of any splash of the liquid from entering the lower housing between the shaft and the opening in the boss.

In the embodiment of my invention as shown in Figure 6, 30 indicates the lower housing and 31 the upper housing, which are provided with bearings as clearly shown and described in the embodiment of my invention as shown in Figures 1 and 2. Mounted in these bearings is a driven shaft 32 on which is arranged a rubber slinger 33 which is provided with a convexed upper surface 34 and an annular depending flange 35 which is adapted to extend downwardly beyond the upper end of an upwardly extending annular flange 36 formed on the cover of the lower housing around the central opening through which the shaft passes.

While in the drawings and specification, I have shown and described an elastic slinger formed of rubber, I am aware that various other elastic materials can be used in forming a slinger, and therefore I do not wish to limit myself to the use of rubber, as the slinger can be made of any elastic material which will form a tight joint between the shaft and slinger so as to accomplish the desired result without departing from the spirit of my invention.

What I claim is:

A slinger for drive units having a rotating shaft comprising an elastic body having an opening through which the shaft is adapted to extend for holding said slinger in adjusted position by the elasticity of the body of the slinger, said slinger having upon its upper surface a gutter provided with oppositely disposed spouts.

In testimony whereof I hereunto affix my signature.

MORTIMER R. ANSTICE.